UNITED STATES PATENT OFFICE.

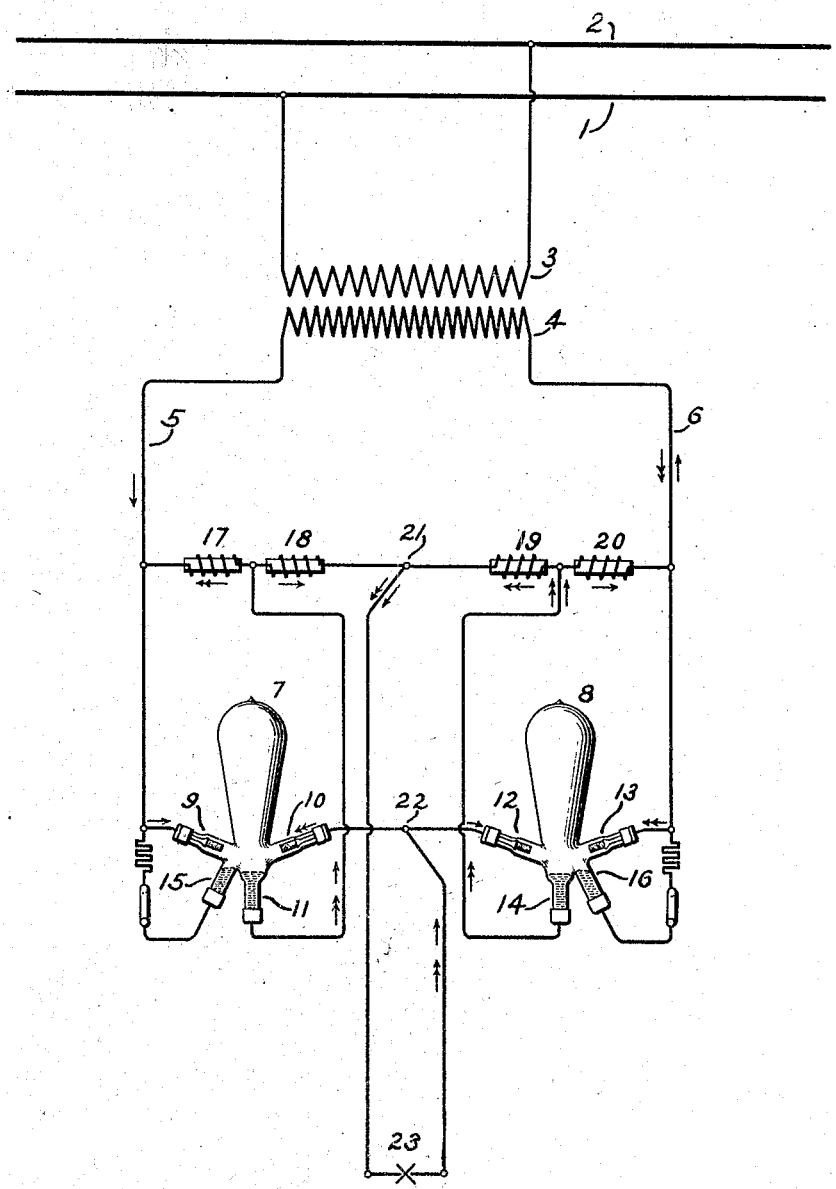

OSIAS O. KRUH, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

No. 900,745.  Specification of Letters Patent.  Patented Oct. 13, 1908.

Application filed September 15, 1905, Serial No. 278,553. Renewed March 6, 1908. Serial No. 419,570.

*To all whom it may concern:*

Be it known that I, OSIAS O. KRUH, a subject of the Emperor of Austria-Hungary, residing at Schenectady, county of Schenectady and State of New York, have invented certain new and useful Improvements in Systems of Electrical Distribution, of which the following is a specification.

My present invention relates to systems of electrical distribution embodying vapor electric apparatus such as rectifiers or the like.

It comprises certain improvements whereby a number of rectifiers may be operated in series with each other, and thus divide between them the stress imposed by the impressed alternating electro-motive force. Among other advantages, this enables a higher voltage alternating current to be rectified than might be feasible with a single rectifier.

The features of novelty which are embodied in my invention are set forth with particularity in the appended claims. The invention itself, however, will be better understood by reference to the following description taken in connection with the accompanying drawings showing diagrammatically one arrangement of my invention.

In the drawings the source of alternating current to be rectified is indicated conventionally by the supply mains 1, 2. A transformer, either of the constant potential or constant current type, having a primary winding 3 and a secondary winding 4 may be used to produce desired changes in the voltage of the source. The leads 5 and 6 extending from the secondary winding convey current to the rectifying system which I will now describe.

I have represented in the drawings two rectifiers at 7 and 8. The individual rectifiers may be of a construction now well understood in the art and therefore require few words of explanation. The rectifier 7 for example consists of an exhausted tube in which are located, in separate arms of the tube, two graphite anodes 9 and 10, while in the bottom of the tube there is arranged a body of mercury 11 constituting a cathode. In the same way the rectifier 8 is provided with anodes 12 and 13 and a mercury cathode 14. Each rectifier has a starting mercury anode connected to one of the main anode leads. In the case of the rectifier 7 the starting anode is indicated at 15, and in the case of the other rectifier at 16.

The rectifiers are provided as usual with compensating reactances. The reactances for the rectifier 7 are indicated at 17 and 18, and in the case of the rectifier 8 they are shown at 19 and 20. In connecting up the apparatus the reactances 17 to 20 are connected in series across the mains 5 and 6, while in a similar manner the rectifier anodes 9, 10, 12 and 13 are linked together across the same mains 5 and 6. The cathode of each rectifier is connected to the junction between the coils of its compensating reactance. Thus the cathode 11 is connected between the coils 17 and 18, while the cathode 14 is connected between the coils 19 and 20.

The load circuit is connected at one end to the junction between the two sets of compensating reactances, as at the point 21, while the other end of the circuit is connected to a point 22 joining together the adjacent anodes 10 and 12 of the two rectifiers.

The paths which the currents of opposite polarities take through the apparatus are indicated respectively by the single and double arrows. Thus the current for one polarity follows down from the lead 5, through the rectifier 7 to the reactance 18, through the load indicated at 23, then through the rectifier 8 to the reactance 20, and back to the other lead 6. The other polarity wave takes a similar path but in the reverse direction through the system as indicated by the double headed arrows. Both waves traverse the load circuit in the same direction.

What I claim as new, and desire to secure by Letters Patent of the United States, is,—

1. The combination of alternating current leads, a plurality of energy-storing devices connected in series across said leads, a plurality of rectifiers, a work circuit extending from said energy-storing devices and connected to said rectifiers, and connections between the rectifiers and the energy-storing devices for passing rectified current through said rectifiers and work circuit in series.

2. The combination of alternating current supply mains, reactances connected in series across said mains, rectifiers having their positive electrodes linked together across said mains and their negative electrodes connected respectively to junction points between pairs of said reactances, and a work circuit connected between a point in said reactances and the junction between two of the anodes of said rectifiers.

3. The combination of alternating current leads, energy-storing devices in series across said leads, a plurality of vapor electric devices having their positive electrodes linked together across said mains, and connections both from the negative electrodes and the junction between adjacent anodes to separate points in the circuit of said energy-storing devices.

In witness whereof, I have hereunto set my hand this 14th day of September, 1905.

OSIAS O. KRUH.

Witnesses:
BENJAMIN B. HULL,
HELEN ORFORD.